United States Patent [19]
Tsai

[11] Patent Number: 5,730,250
[45] Date of Patent: Mar. 24, 1998

[54] GEAR TYPE GREASE PUMP

[76] Inventor: Shih-tien Tsai, No. 1, Ai 3rd Road, Taoyuan Hsien, Taiwan

[21] Appl. No.: 746,122

[22] Filed: Nov. 6, 1996

[30] Foreign Application Priority Data

Jun. 7, 1996 [CN] China ............... 96 2 12450.8

[51] Int. Cl.$^6$ ............... F16N 13/20; F16N 11/06
[52] U.S. Cl. ............... 184/31; 184/46; 184/105.2; 222/259; 222/261; 418/206.1; 418/206.4
[58] Field of Search ............... 184/6.18, 6.24, 184/6.28, 7.4, 31, 46, 105.2; 418/206.1, 206.4; 222/189.11, 256, 259, 260, 261, 262

[56] References Cited

U.S. PATENT DOCUMENTS

| | | | |
|---|---|---|---|
| 2,624,422 | 1/1953 | Molyneux | 184/6.24 |
| 2,810,496 | 10/1957 | Gray | 222/256 |
| 3,780,830 | 12/1973 | Helgerud et al. | 184/105.2 |
| 4,534,493 | 8/1985 | Sedran | 222/259 |
| 4,629,405 | 12/1986 | Hidasi et al. | 184/31 |
| 4,790,456 | 12/1988 | Nakane et al. | 222/259 |
| 5,257,723 | 11/1993 | Bagung | 222/261 |
| 5,468,132 | 11/1995 | Snell et al. | 418/206.4 |

*Primary Examiner*—Christopher Verdier
*Attorney, Agent, or Firm*—Bucknam and Archer

[57] ABSTRACT

A gear type grease pump includes a motor fixed on the top surface of a base plate, a gear type pump fixed on the bottom surface of the base plate, the pump having a pair of gears engaged with each other and rotationally driven by the motor for rotating, a housing body and a bottom cover for accommodating the two gears, and a grease inlet and a grease outlet opposite to the grease inlet both provided on the housing body. A grease sweeping blade is located below the bottom cover and driven by the pump. A sealing ring is fixed along the bottom surface periphery of the base plate. A perforated mesh hood is located within the sealing ring and encloses the gear type pump and the grease sweeping blade. And a grease path is provided inside the base plate to communicate with the grease outlet path when the pump is fixed on the base plate, and the outlet of the grease path is connected with a conventional grease gun. Since the entire grease pump is loaded with grease, the grease having the tendency to flow into the grease inlet is fed into the pump, and the pump steadily squeezes out the grease.

4 Claims, 3 Drawing Sheets ved sectional perspective view of the
5,730,250

1
GEAR TYPE GREASE PUMP

FIELD OF THE INVENTION

The present invention relates to a grease pump, and more particularly to an improved structure of a gear type grease pump, such that the grease can steadily enter into the pump and be squeezed out.

BACKGROUND OF THE INVENTION

In conventional grease pumps, grease within a grease barrel is sucked up to a pump actuated by pressurized air, it then flows out via the outlet of the grease gun and is squeezed through a grease nipple into the bearing housing of machine parts. It is very difficult to suck up the grease by such conventional grease pumps of pressurized air type due to the high viscosity of the grease. It has been found in practical operation that the grease around the pump can not be easily pushed into the empty region by utilizing the pressure difference between the vacuum degree in the pump and the atmospheric pressure acting upon the grease surface in the grease barrel. Therefore, after using the conventional grease pump of pressurized air type for several times, practically the pump has to be shaken by the user to vibrate the grease into the empty region so as to perform the next sucking/injection steadily.

SUMMARY OF THE INVENTION

The object of the present invention is therefore to provide an improved structure of a gear type grease pump which can fill up the empty region around the grease inlet of the pump with grease, and make the grease around the grease inlet of the pump always have the tendency to flow so as to perform the operation of sucking/injection of the grease steadily.

The grease pump according to the present invention comprises a gear type pump actuated by a motor, and a perforated rigid mesh hood surrounding the gear type pump. Thus, when the grease pump of the present invention is placed inside a grease barrel being full of grease with the rigid mesh hood downward the empty region of the grease pump in the mesh hood is surrounded and filled with grease due to the fact that the entire weight of the grease pump presses the grease within the grease barrel and forces the grease to flow through many meshes on the mesh hood. Therefore, by means of the present invention, it is assured that the grease always has a tendency to flow into the grease inlet of the pump and the grease pump is kept in steady operation.

Another object of the present invention is to provide a grease sweeping blade located under the grease inlet of the pump and actuated by the motor, whereby to further force the grease entered into the mesh hood to flow to the grease inlet to be sucked up and squeezed out so that the grease flow rate can be stabilized.

BRIEF DESCRIPTION OF THE DRAWINGS

In order to substantially understand the above objects and the effect of the present invention, a preferred embodiment is described below in conjunction with the accompanying drawings, in which.

2

Figure 3:
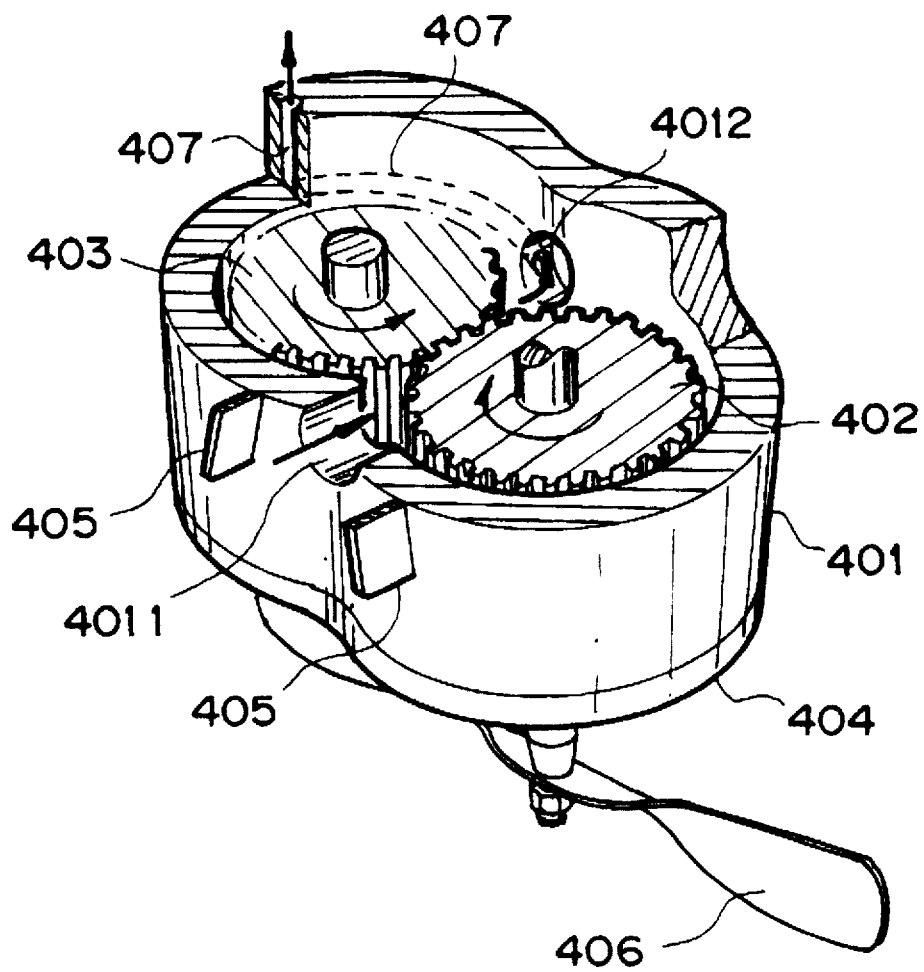

FIG. 3 is an enlarged sectional perspective view of the gear type pump showing its interior structure.

DETAILED DESCRIPTION OF THE INVENTION

Figure 1:
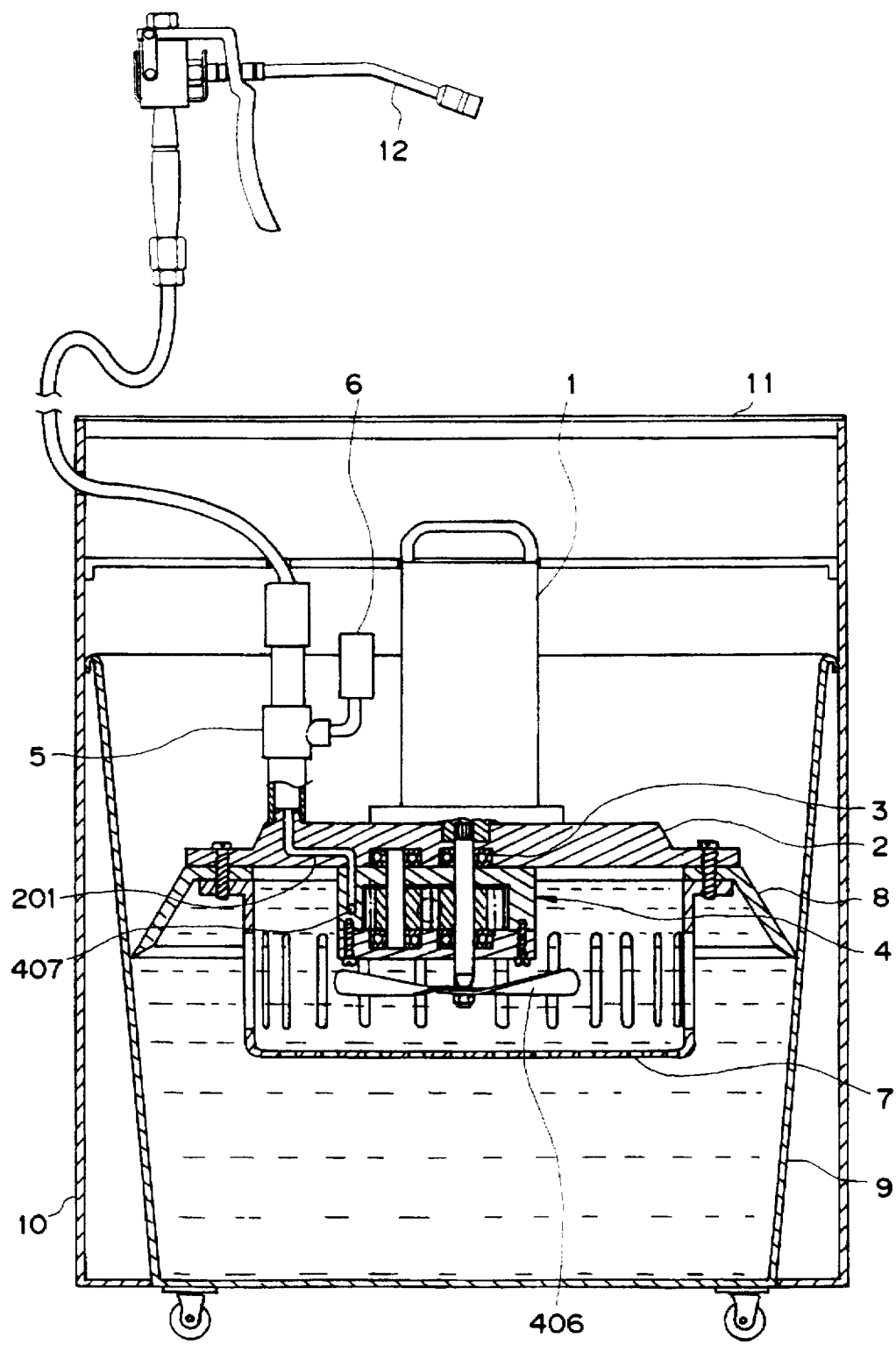
FIG. 1 is a partial cross sectional view showing the status of the grease pump according to the present invention placed inside a grease barrel.
Figure 2:
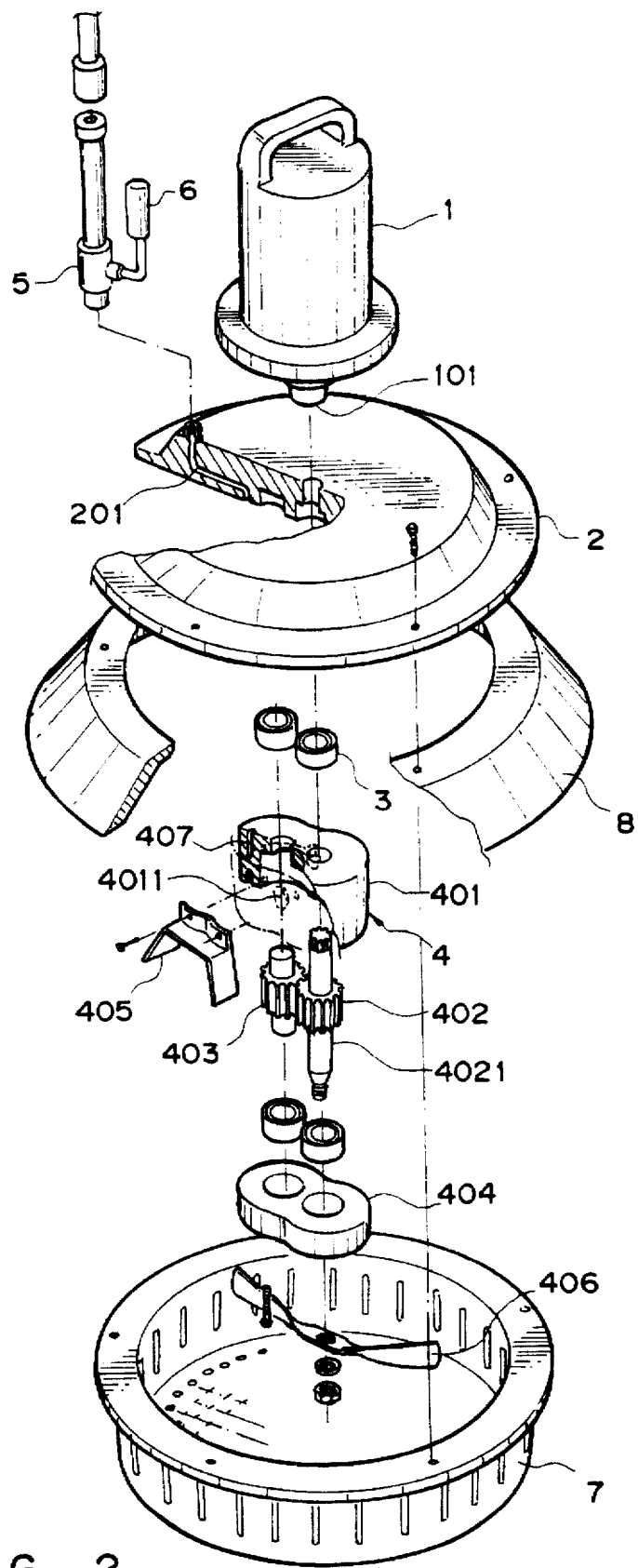
FIG. 2 is an exploded perspective view showing the constituent members of the present invention in their relative positions, wherein some of the members are sectioned.

Referring to the gear type grease pump of the present invention shown in FIGS. 1 and 2, which comprises a motor 1 being in an upright status and fixed on the top surface of a base plate 2, with the rotary axis 101 penetrating downward into the base plate 2 and fitted into the bearing 3 which is mounted on the bottom surface of the base plate 2. A gear type pump 4 is mounted on the other surface of the base plate 2 and driven by the rotary axis 101 of the motor 1. As shown in FIG. 3, the gear type pump 4 comprises a housing body 401 for accommodating a driving gear 402 and a driven gear 403, engaging with each other; a bottom cover 404 for covering the bottom opening of the housing body; a grease collecting cap 405 in inverted "U" shape, being fixed above the grease inlet 4011 provided on the housing body; and a grease sweeping blade 406 positioned below the bottom cover 404 and driven by the axis 4021 of the driving gear 402 protruding out of the bottom cover 404. Moreover, the grease outlet 4012 on another side wall of the housing body 401 and opposite to the grease inlet 4011 communicates with the grease outlet path 407 provided within the side wall of the housing body 401. The grease outlet path 407 communicates with the grease path 201 provided within the base plate 2 when the pump is fixed to the base plate 2. The opening of the grease path 201 on the top of the base plate 2 communicates with a pressure release valve 6 and a conventional grease gun 12 respectively via a three-way cock 5.

Finally, the pump 4 is enclosed with a perforated rigid mesh hood 7, and a flexible sealing ring 8 of horn type is fixed along the bottom surface periphery of the base plate 2.

The grease pump formed according to the present invention is placed inside of a grease barrel 9 (filled up with grease) with the mesh hood 7 downward as shown in FIG. 1, and the flexible sealing ring 8 is pushed outward against the inner wall of the grease barrel 9. The grease barrel 9 is put into an outer barrel 10 which is covered by an outer cover 11. Having placed the grease pump as described above, the motor 1 is turned on to actuate the driving gear 402 of the pump, so the driven gear 403 and the grease sweeping blade 406 are also driven to rotate synchronously. Since the grease pump of the present invention is placed on top of the grease surface and the entire weight of the grease pump presses on the grease surface through the mesh hood 7, the grease flows into the mesh hood 7 through the meshes of the mesh hood 7, causing parts of the grease pump below the base plate 2 to immerse in the grease, the parts are totally covered with the grease which has a tendency to flow. The rotation of the grease sweeping blade 406 further enhances the tendency of the grease to flow into the grease inlet. Therefore, the grease continuously flows into the pump through the grease inlet and is squeezed out by a pair of gears with high pressure, and through the grease path and the conventional grease gun to inject into the bearing of a machine.

During the operation of the grease pump, the grease within the mesh hood 7 is gradually consumed. However, in the course of consumption, since the weight of the grease pump is always pressing on the grease via the mesh hood 7, the grease inside the grease barrel 9 and outside the mesh hood 7 is forced to pass through the meshes of the mesh hood 7 continuously, to flow into the mesh hood 7 and fill it up, and maintain the tendency of the grease to flow into the grease inlet. After the grease of grease barrel 9 is totally consumed, the user will then pull out the grease pump from the empty grease barrel, and place the grease pump upon another new grease barrel so as to proceed the next grease pumping operation.

To sum up all the foregoing, the tendency of the grease flowing into the pump grease inlet is maintained by using the gear type grease pump of the present invention, so as to assure stability of the grease input as well as to maintain normal operation of the grease pumping. Therefore, the present invention is really novel

I claim:

1. A grease pump assembly, comprising:

a motor fixed on a top surface of a base plate;

a gear type pump fixed on a bottom surface of said base plate, having a pair of gears engaged with each other and driven by said motor for rotating, a housing body and a bottom cover for accommodating said two gears, a grease inlet in said housing body and a grease outlet in said housing body opposite to said grease inlet;

a grease sweeping blade located below the bottom cover of said housing body and driven by said pump for rotating synchronously;

a sealing ring fixed along the bottom surface periphery of said base plate;

a perforated mesh hood located within the sealing ring and enclosing the gear type pump and the grease sweeping blade; and a grease path provided inside the base plate communicating at a first end with the grease outlet in said housing body and at a second end with a grease gun; whereby the entire grease pump is loaded on the grease so that the grease tends to flow into the grease inlet to be fed into the pump, and the pump steadily squeezes out the grease.

2. The gear type grease pump according to claim 1, wherein said sealing ring is a horn type.

3. The gear type grease pump according to claim 1, further comprising a grease collecting cap in an inverted "U" shape, being fixed above the grease inlet on the housing body for directing the grease forced to flow by the weight of the grease pump to flow into said grease inlet.

4. The gear type grease pump according to claim 1, wherein the grease path provided within the base plate is connected to a pressure releasing valve.

* * * * *